United States Patent
Jain et al.

(10) Patent No.: US 6,614,787 B1
(45) Date of Patent: Sep. 2, 2003

(54) SYSTEM AND METHOD FOR EFFICIENTLY HANDLING MULTICAST PACKETS BY AGGREGATING VLAN CONTEXT

(75) Inventors: Vipin Kumar Jain, Santa Clara, CA (US); Peter Si-Sheng Wang, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/283,027

(22) Filed: Mar. 30, 1999

(51) Int. Cl.[7] .............................................. H04L 12/28
(52) U.S. Cl. ........................................ 370/390; 370/432
(58) Field of Search ............................... 370/254, 255, 370/389, 390, 392, 400, 401, 395.53, 473, 432

(56) References Cited

U.S. PATENT DOCUMENTS

| | | | | |
|---|---|---|---|---|
| 4,864,559 A | * | 9/1989 | Perlman | 340/825.02 |
| 5,684,800 A | * | 11/1997 | Dobbins et al. | 370/401 |
| 5,959,989 A | * | 9/1999 | Gleeson et al. | 370/390 |
| 6,046,989 A | * | 4/2000 | Takahashi | 370/312 |
| 6,188,691 B1 | * | 2/2001 | Barkai et al. | 370/390 |
| 6,370,142 B1 | * | 4/2002 | Pitcher et al. | 370/390 |

* cited by examiner

Primary Examiner—Melvin Marcelo
Assistant Examiner—Derrick W. Ferris
(74) Attorney, Agent, or Firm—Wagner, Murabito & Hao LLP

(57) ABSTRACT

A method and system for efficiently handling multicast packets by aggregating VLAN (virtual local area network) context. In one embodiment, multicast registration information is received for a first client in one VLAN and then multicast registration information for the second client in a second VLAN. An aggregated list is created of the multicast registration information for the first client and the second client. In this embodiment, the aggregated list of the multicast registration information is forwarded for the first client and the second client to a second intermediate device. Then, when handling a multicast packet at the second intermediate device, the present invention accesses the aggregated list of the multicast registration information for the first client and the second client. As a result, the present invention allows the second intermediate device to perceive having only a single VLAN registered to receive the multicast packet.

20 Claims, 6 Drawing Sheets

|   IP Address   | Port Membership |
|---|---|
|  |  |
|  |  |
|  |  |
|  |  |
|  |  |
|  |  |
|  |  |

| IP Address | VLAN Identification | Port Membership |
|---|---|---|
|  |  |  |
|  |  |  |
|  |  |  |
|  |  |  |
|  |  |  |
|  |  |  |
|  |  |  |

FIG. 7

SYSTEM AND METHOD FOR EFFICIENTLY HANDLING MULTICAST PACKETS BY AGGREGATING VLAN CONTEXT

TECHNICAL FIELD

The present invention generally pertains to the field of computer networking. More particularly, the present invention is related to multicast packet handing.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

Computer networks can be arranged in numerous configurations comprising a variety of network types. Some of the most popular types of networks comprise Ethernet (coaxial cable or twisted-pair cable), token ring, Fiber Distributed Data Interface (FDDI), Frame Relay, Integrated Services Digital Network (ISDN), X.25, Synchronous Data Link Control (SDLC). Typically, these networks are arranged in local area networks (LANs) and wide area networks (WANs). Usually, LANs are distinguished from WANs based upon the geographical area they cover and sometimes the number of users connected to the network. For example, a group of personal computers (PCs) in a home or single business site (location) usually communicate with each other over a LAN. Groups of PCs disposed remote from one another, such as those in different homes, different companies, or different branch offices of the same company, typically communicate with each other over a WAN.

Presently, an Institute of Electrical and Electronics Engineering (IEEE) draft standard, 802.1Q, defines a mechanism to identify and classify packets in a VLAN (virtual local area network) environment. Currently, the standard defines a method to classify packets into VLANs (if they are not already classified) based on the incoming ports, also known as port-based VLAN classification system. In a typical configuration containing various intermediate devices (i.e. switches, routers, and the like), VLANs map one-to-one to subnets. Additionally, such VLANs are used to segregate device ports (e.g. client device ports) into separate broadcast domains. Such an approach contains the broadcast and unknown packets to only those ports that are in the same subnet. While this mechanism works fine for unicast packets, multicast forwarding is quite extensive. That is, conventional intermediate devices operating under existing protocols are often forced to replicate multicast packets.

More specifically, in a conventional prior art approach, an intermediate device receives multicast group membership registrations in different VLANs and records this information for forwarding purposes in a forwarding database. In 802.1Q-compliant intermediate devices, the MAC (media access control) address and the receiving VLAN identification (VID) are used together to index such a database to identify the outbound ports. In existing prior art approaches, when an intermediate device receives a multicast packet, the intermediate device must search the forwarding database for all the members in all possible VLANs. The conventional intermediate device then forwards the multicast packet separately to each registered VLAN. Such a conventional method is complicated and expensive to implement in ASICs (application specific integrated circuit). As yet a more egregious disadvantage, such a conventional method also frequently results in wasteful replication of a multicast packet. That is, the conventional intermediate device must make multiple copies of the same multicast packet and then forward the multiple copies out a single port to which registered members in multiple VLANs are coupled. In some attempts to alleviate this problem, practitioners have resort to easier (but slower) software based forwarding of multicast packets.

In addition to the disadvantages associated with replication of multicast packets, the required lookups in the forwarding database have significant drawbacks associated therewith. That is, conventional approaches require the intermediate device to perform at least one lookup in the forwarding database for all potentially registered VLANs. These lookups are expensive in CPU (central processing unit) cycles, memory space, and intermediate device performance.

Thus, a need exists for a method and system which eliminates unnecessary replication of multicast packets. Still another need exists for a method and system which reduces superfluous expensive lookups in multicast registration tables. Still another need exists for a system and method which meets the above-listed needs but which operates effectively in a VLAN environment.

DISCLOSURE OF THE INVENTION

The present invention provides a method and system which eliminates unnecessary replication of multicast packets. The present invention further provides a method and system which reduces superfluous expensive lookups in multicast registration tables. The present invention also provides a system and method which achieves the above-listed accomplishments and which operates effectively in a VLAN environment.

In one embodiment, the present invention receives, at a first intermediate device, multicast registration information for a first client in one VLAN. Next, the present invention receives, at the first intermediate device, multicast registration information for a second client in a second VLAN. The present invention then creates an aggregated list of the multicast registration information for the first client in one VLAN and the second client in a second VLAN. In this embodiment, the present invention forwards the aggregated list of the multicast registration information for the first client in one VLAN and the second client in a second VLAN to a second intermediate device. Then, when handling a multicast packet at the second intermediate device, the present invention accesses the aggregated list of the multicast registration information for the first client in one VLAN and the second client in a second VLAN. As a result, the present invention allows the second intermediate device to perceive having only a single VLAN registered to receive the multicast packet. Hence, the present invention allows the second intermediate device to forward a single multicast packet which will later be supplied to registered member ports. In so doing, the present invention prevents unnecessary replication of multicast packets and avoids superfluous expensive lookups in multicast registration tables.

In another embodiment, the present invention includes the features of the above embodiment and specifically recites that the aggregated list is comprised of an aggregation of an egress list for a port of the first intermediate device to which the first client in one VLAN is coupled and an egress list for a port of the second intermediate device to which a second client in a second VLAN is coupled.

In still another embodiment, the present invention includes the features of the first-listed above embodiment and specifically recites that when handling a multicast packet which is to be transmitted between the first client in one VLAN and the second client in a second VLAN, the first intermediate device is adapted to transmit the multicast packet between the first client in one VLAN and the second client in a second VLAN without intervention by the second intermediate device.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a forwarding database table in which VLAN context is not stored in accordance with one embodiment of the present claimed invention.

FIG. 7 is a forwarding database table in which VLAN context is stored in accordance with one embodiment of the present claimed invention.

Figure 1:
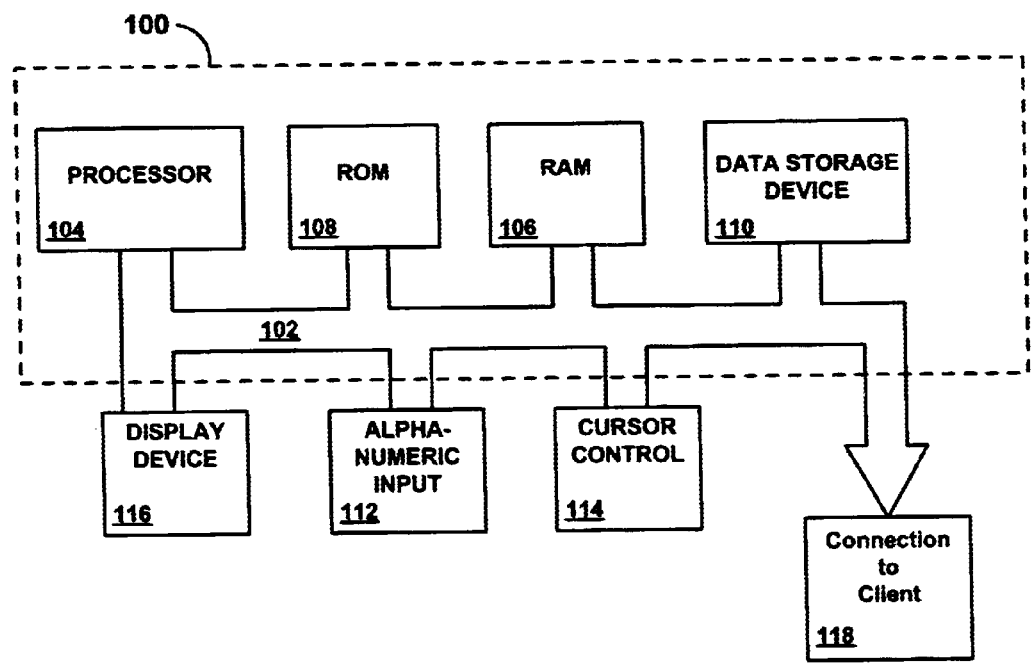
FIG. 1 is a schematic diagram of an exemplary computer system used to perform steps of the present method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "creating", "handling", "accessing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers. Although the present application will refer to a computer system, for purposes of the present application, a computer system is intended to refer to, for example, an intermediate device such as a network switch, router, and the like. Hence, the following discussion which refers to processes performed by a computer system also pertains to processes performed by an intermediate device or a plurality of intermediate devices.

COMPUTER SYSTEM ENVIRONMENT OF THE PRESENT INVENTION

With reference now to FIG. 1, portions of the present method and system are comprised of computer-readable and computer-executable instructions which reside, for example, in computer-usable media of a computer system. FIG. 1 illustrates an exemplary computer system 100 used to perform the present invention. It is appreciated that system 100 of FIG. 1 is exemplary only and that the present invention can operate within a number of different computer systems including general purpose networked computer systems, embedded computer systems, and stand alone computer systems. Furthermore, as will be described below in detail, the components of computer system 100 reside, for example, in a client computer and/or in the intermediate device of the present system and method. Additionally, computer system 100 of FIG. 1 is well adapted having computer readable media such as, for example, a floppy disk, a compact disc, and the-like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. Central processor unit 104 may be an 80×86-family microprocessor. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information. Additionally, computer system 100 of the present embodiment includes feature 118 for connecting computer system 100 (e.g. intermediate device 210 of FIG. 2) to a client.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the method and system embodiments of the present invention are found below.

DETAILED DESCRIPTION OF THE ENVIRONMENT OF THE PRESENT INVENTION

Figure 2:
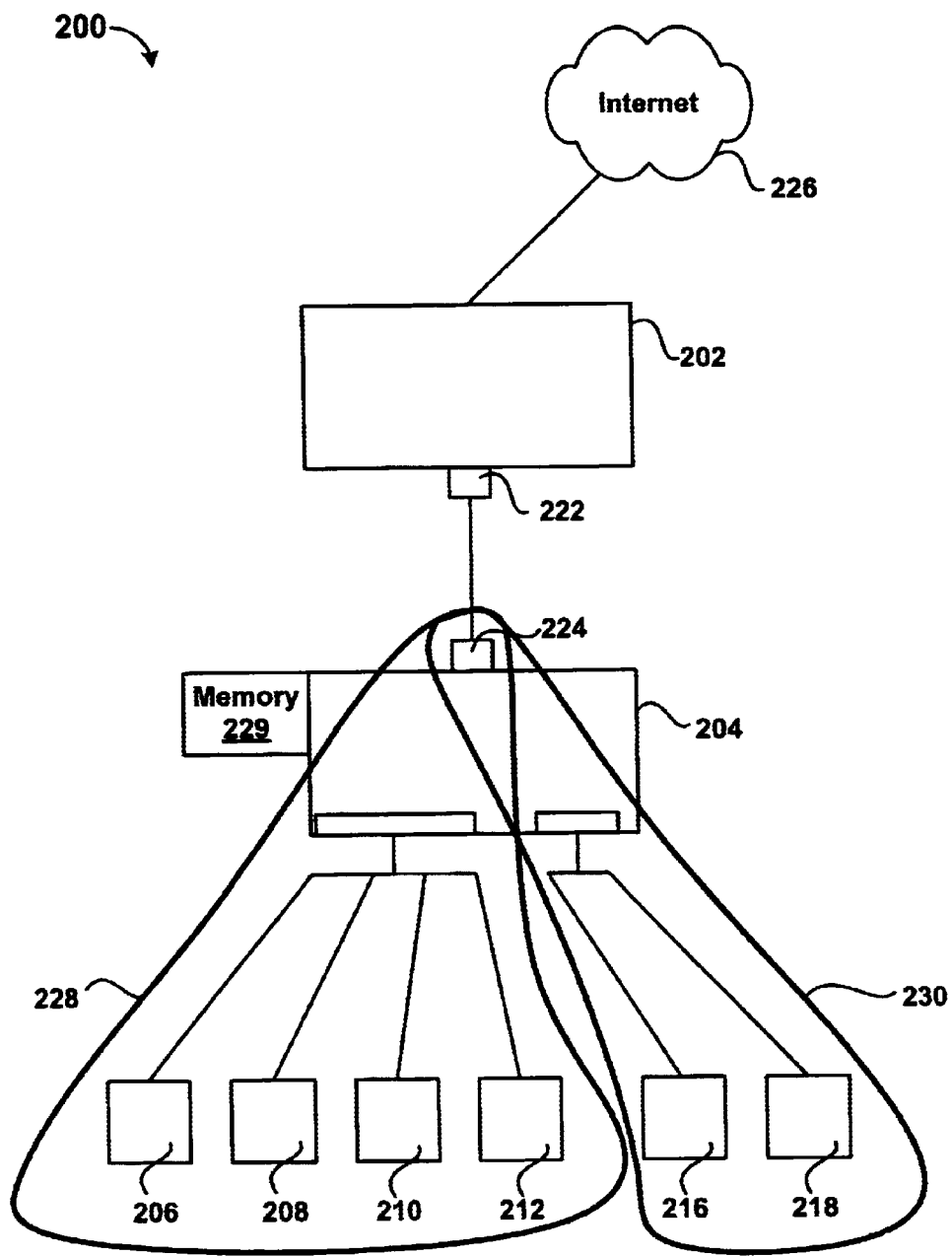
FIG. 2 is a schematic representation of a network architecture in which is employed a system and method for efficiently handling multicast packets by aggregating VLAN context in accordance with one embodiment of the present invention.

With reference now to FIG. 2, a schematic representation of a network architecture 200 in which is employed a method and system for efficiently handling multicast packets by aggregating VLAN (virtual local area network) context in accordance with one embodiment of the present invention is shown. The present discussion will begin with a detailed description of the structure and physical components relevant to the present invention. The discussion will then describe, in detail, the operation the components of network architecture 200 and the various embodiments of the present invention. Referring again to FIG. 2, network architecture 200 includes a first intermediate device (intermediate device 204) which is coupled to a second intermediate device (intermediate device 202). In the present embodiment intermediate device 202 is for example, a layer 3 device such as a router. Similarly, in the present embodiment intermediate device 204 is a layer 2 device such as a switch (the present embodiment is also well suited to a layer 3 switch). The present invention is however well suited to use with various types of intermediate devices residing at various layers. Network architecture 200 of the present embodiment also includes clients 206, 208, 210, and 212 which are coupled to port 214 of intermediate device 204. Network architecture 200 of the present embodiment also includes clients 216 and 218 which are coupled to port 220 of intermediate device 204. Furthermore, as shown in FIG. 2, port 222 of intermediate device 202 is used to couple intermediate device 202 to port 224 of intermediate device 204. FIG. 2 also shows the Internet 226 coupled to intermediate device 202.

It will be understood that numerous other components may be present between intermediate device 202 and Internet 226 and numerous other components will exist in a typical network architecture. For purposes of clarity, the various other components are not shown in FIG. 2. Intermediate device 204 includes memory 229 such as, for example, ROM 108 and/or RAM 106 of FIG. 1. Although memory 229 is shown integral with intermediate device 204 in the embodiment of FIG. 2, the present invention is also well suited to an embodiment in which memory 229 is located separately from, but still accessible by, intermediate device 204.

Referring still to FIG. 2, a typical intermediate device such as intermediate device 202 or 204 may have less or considerably more ports, however, for purposes of clarity only 6 ports 206, 208, 210, 212, 216, and 218 are shown in FIG. 2. In architecture 200 of FIG. 2, clients 206, 208, 210, 212, 216, and 218 are personal computers (PCs), however, although the clients are PCs in network architecture 200, the present invention is also well suited to an embodiment in which clients 206, 208, 210, 212, 216, and 218 are comprised of devices other than PCs (e.g. personal digital assistants, servers, and the like). Additionally, although only six clients 206, 208, 210, 212, 216, and 218 are shown for purposes of clarity, the present invention is also well suited to a use with a system having a greater or lesser number of clients. Also, intermediate devices 204 and 202 of the present embodiment may contain, for example, some of the features of computer system 100 described above in detail in conjunction with FIG. 1.

With reference still to FIG. 2, clients 206, 208, 210, and 212 coupled to port 214 of intermediate device 204 reside within a common VLAN 228. Clients 216 and 218 coupled to port 220 of intermediate device 204 reside within a common VLAN 230. Hence VLAN 228 and VLAN 230 are accessed through common ports 224 and 222 of intermediate devices 204 and 202, respectively.

DETAILED DESCRIPTION OF THE OPERATION OF THE PRESENT INVENTION

Figure 3:
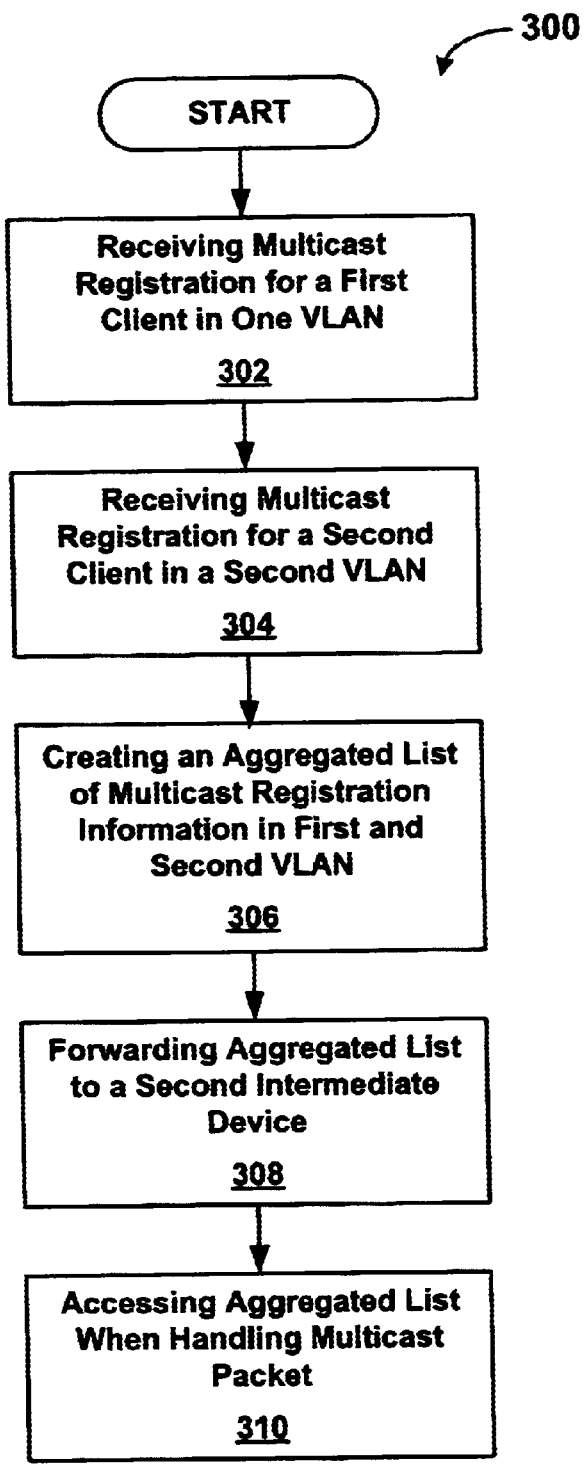
FIG. 3 is a flow chart of steps performed in accordance with one embodiment of the present claimed invention.

With reference next to FIG. 3, a flow chart 300 of exemplary steps performed in one embodiment of the present invention is shown. Flow chart 300 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1 physically residing, for example, in intermediate device 202 of FIG. 2. The computer-readable and computer-executable instructions are used to control or operate in conjunction with, for example, central processing unit 104 of FIG. 1. As mentioned above, the features of the computer system of FIG. 1 are well suited to being disposed, for example, in intermediate device 204. Although specific steps are disclosed in flow chart 300 of FIG. 3, such steps are exemplary. That is, the present invention is well suited to performing various other steps or variations of the steps recited in FIG. 3.

The steps of the present embodiment will be described in conjunction with the physical components of FIG. 2. As an overview, the following discussion pertain to the operation of intermediate device 204 in conjunction with intermediate device 202 and clients 206, 208, 210, 212, 216 and 218 coupled to intermediate device 204. Specifically, in the embodiments of the present invention, intermediate device 204 efficiently handles multicast packets by aggregating VLAN (virtual local area network) context. In so doing, the present invention prevents unnecessary replication of multicast packets and avoids superfluous expensive lookups in multicast registration tables.

Referring now to step 302, the present embodiment receives multicast registration information for a first client in one VLAN (via e.g. an IGMP report or routing update). Although the present discussion specifically recites receiving multicast registration information for a first client in one VLAN, it will be understood that such multicast registration information can pertain to more than one client coupled to a port of an intermediate device (e.g. port 214 of intermediate device 204). Additionally, in one embodiment such multicast registration information is tagged with or assumed to have a VLAN identification (VID) which is also configured in the egress list of a particular port. More particularly, in the present embodiment, intermediate device 204 receives multicast registration information from clients 206, 208, 210, 212, 216 and 218 via an Internet Group Management Protocol (IGMP) registration. Thus, in one embodiment, at step 302, intermediate device 204 will receive an IP multicast registration in VLAN 228.

Referring next to step 304, the present embodiment receives multicast registration information for a second client in second VLAN (via e.g. an IGMP report or routing update). Again, although the present discussion specifically recites receiving multicast registration information for a second client in a second VLAN, it will be understood that such multicast registration information can pertain to more than one client coupled to a port of an intermediate device (e.g. port 220 of intermediate device 204). Thus, in this embodiment, at step 304, intermediate device 204 will receive an IP multicast registration in VLAN 230.

At step 306, the present embodiment creates an aggregated list of the multicast registration information for the first client in one VLAN and the second client in a second VLAN. That is, the present embodiment "combines" or "aggregates" the multicast registration information for the plurality of VLANs (i.e. VLAN 228 and VLAN 230). As an example, in the present embodiment, the multicast registration information in VLAN 228 would include the VID for VLAN 228 (for purposes of clarity, the VID for VLAN 228 will be referred to as "VLAN 228"). Similarly, the multicast registration information in VLAN 230 would include the VID for VLAN 230 (for purposes of clarity, the VID for VLAN 230 will be referred to as "VID 230"). Thus, in a conventional prior art approach, the egress list for port 222 and port 224 would contain [VID 228, VID 230] indicating both VLANs exist on port 222 and port 224. In the present embodiment, however, a new or virtual VID is selected which represents the aggregation of the existing VIDs. This virtual VID is referred to as an aggregated VID. The aggregated VID of the present embodiment is chosen from among those VIDs that are not in the egress list of relevant ports. In the present embodiment a new VID "VID 500" is selected wherein VID 500 represents the aggregation of VID 228 and VID 230. This aggregated VLAN can be local to a port or global to the intermediate device 204. In one embodiment of the present invention the aggregated VID is a configurable parameter on intermediate device 204.

Referring still to step 306, in one embodiment, the present invention creates a database correlating the aggregated list (e.g. aggregated VID 500) to the multicast registration information for the first client in one VLAN (e.g. VID 228) and the multicast registration information for the second client in a second VLAN (e.g. VID 230). That is, the present embodiment stores, for example, in memory 229, a database which indicates that VID 500 represents an aggregation of VID 228 and VID 230. Although specific memory 229 is recited as being coupled to intermediate device 204, the present invention is also well suited to embodiments having various other types of memory and to having the database stored at various other locations, and the like. Although such an approach is mentioned here, the present invention is also well suited to an embodiment in which such storage is not performed. That is, in one embodiment, the proper VLAN context is applied by the member ports However, in such an embodiment VID tagging by the port may or may not be required depending upon the "untag" specification for the VLAN in which the registration was received. Additionally, in the present embodiment, port memory storing either the PVID or VLAN in which the VLAN was received facilitates correct forwarding on multi-VLAN ports with a single registration.

At step 308, once an aggregated VID is selected by intermediate device 204, the VLAN is registered with intermediate device 202 using GVRP (group VLAN registration protocol). This results in intermediate device 202 adding an aggregated VID in the egress list of port 222. The multicast registration is made in this aggregated VID by intermediate device 204 (to intermediate device 202). So, instead of receiving multicast registration in VLAN 228 and 230, intermediate device 202 receives registration in VLAN 500 alone. Alternatively, intermediate device 204 propagates multicast registration to intermediate device 202 in VLAN 228 and 230 but intermediate device 202 negotiates (and pretends) that is received a single registration in VLAN 500.

With reference now to step 310, the present embodiment accesses the aggregated list of the multicast registration information for the first client in one VLAN and the second client in a second VLAN when handling a multicast packet at intermediate device 202. In one example, intermediate device 202 receives a multicast packet (for which multicast registration is received in the aggregated VID) from the Internet 226. Intermediate device 202 then accesses the aggregated VID in its forwarding database, not shown. Because registration was received (or assumed) in a single VLAN (i.e. aggregated VID 500), intermediate device 202 forwards the multicast packet (without requiring unnecessary replication thereof) through port 222 and port 224 to intermediate device 204. When the multicast packet is received at intermediate device 204, a single packet is forwarded internally and member ports may apply VLAN context on the way out. Thus, intermediate device 204 forwards the multicast packet on port 214 to VLAN 228 and on port 220 to VLAN 230. In one embodiment, the member ports apply the context on the way out (PVID on single-VLAN ports and the corresponding aggregated VID on multi-VLAN ports). In so doing, the present invention prevents unnecessary replication of multicast packets by intermediate device 202. Additionally, by aggregating the VLAN context, the present invention reduces the number of VLAN context entries stored in the forwarding database and, thus, avoids superfluous expensive lookups in multicast registration tables (e.g. the forwarding database).

As yet another advantage, the present embodiment provides a "shortcut" when handling a multicast packet which is to be transmitted between a first client in one VLAN and a second client in a second VLAN which are both coupled to intermediate device 204. For example, if a multicast packet is intended to be transmitted from VLAN 228 to VLAN 230, the present embodiment eliminates the need for intervention by intermediate device 202. More particularly, when a multicast packet originates from, for example VLAN 228, the multicast packet is tagged with the VLAN 228 VID, 228. By obeying existing packet forwarding protocol, intermediate device 204 of the present embodiment will forward that multicast packet to VLAN 230. Hence, multicast packets are efficiently transferred between VLANs on the same intermediate device without intervention by another higher layer intermediate device (e.g. intermediate device 202). Additionally, in another embodiment, the present invention does not aggregate the VLAN context when direct forwarding of multicast packets is unwanted. In one such example, a client in VLAN 228 is generating test data to be multicast to various other members, not shown, of VLAN 228 wherein the test data is irrelevant to and unwanted by VLAN 230. Under such circumstances it may be disadvantageous to aggregate the VLAN context and constantly flood VLAN 230 with the test data. Thus, in such a case, the present embodiment is well suited to not aggregating the VLAN context.

Figure 4:
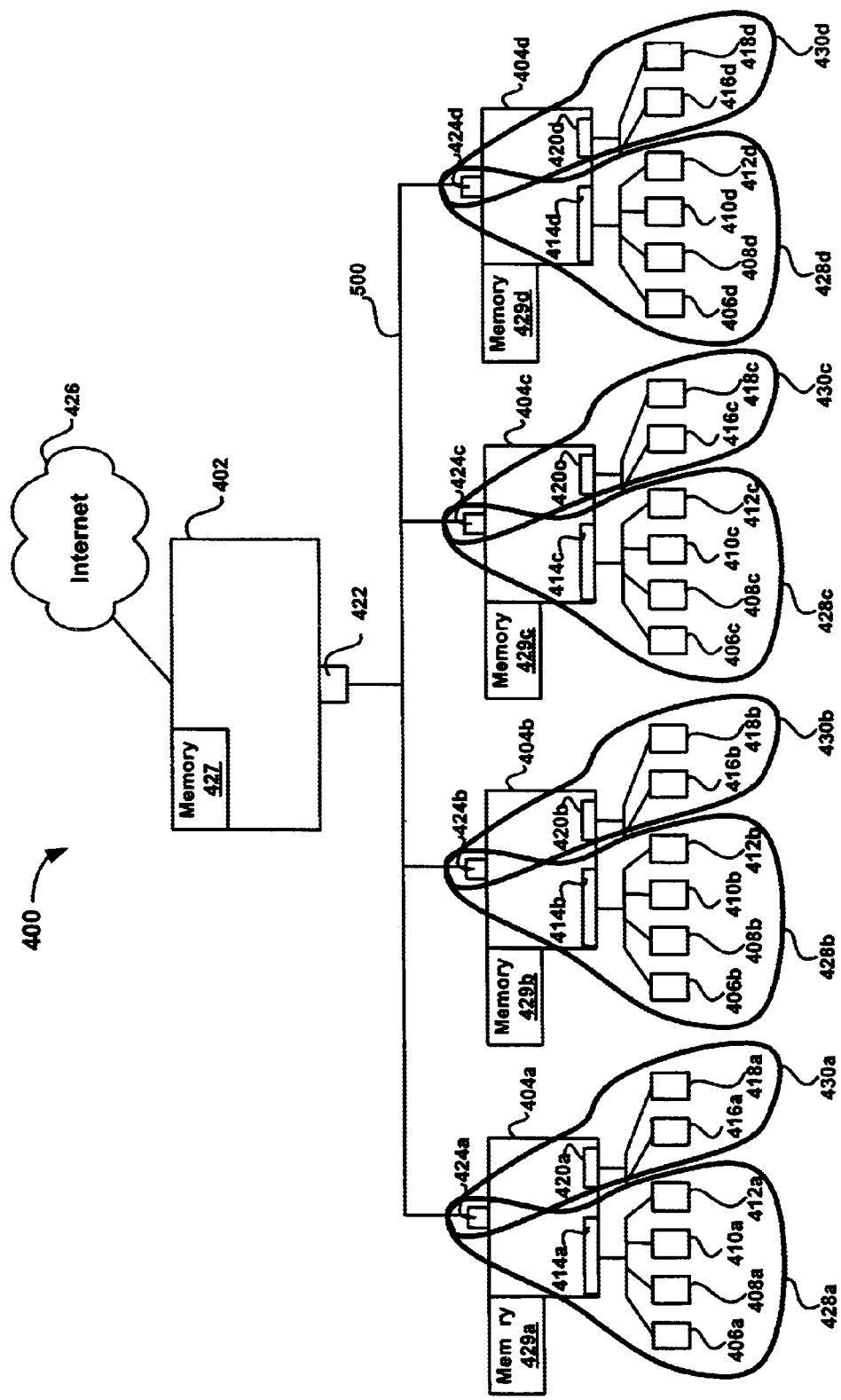
FIG. 4 is a is a schematic representation of a network architecture in which is employed a system and method for efficiently handling multicast packets by ignoring aggregated VLAN context in accordance with one embodiment of the present invention.

With reference now to FIG. 4, a schematic representation of a network architecture 400 in which is employed another embodiment of the present invention is shown. The architecture of FIG. 4 is similar to that of FIG. 2 with the exception that a plurality of intermediate devices 404a–404d are coupled to intermediate device 402. As shown in FIG. 4, each of intermediate devices 404a–404d has a respective plurality of clients 406a–406d, 408a–408d, 410a–410d, 412a–412d, 416a–416d, and 418a–418d coupled thereto. Each of intermediate devices 404a–404d has a respective memory 429a–429d coupled thereto as well. Although four intermediate devices are shown in FIG. 4, the present invention is well suited to an embodiment having fewer or greater intermediate devices coupled to intermediate device 402.

Figure 5:
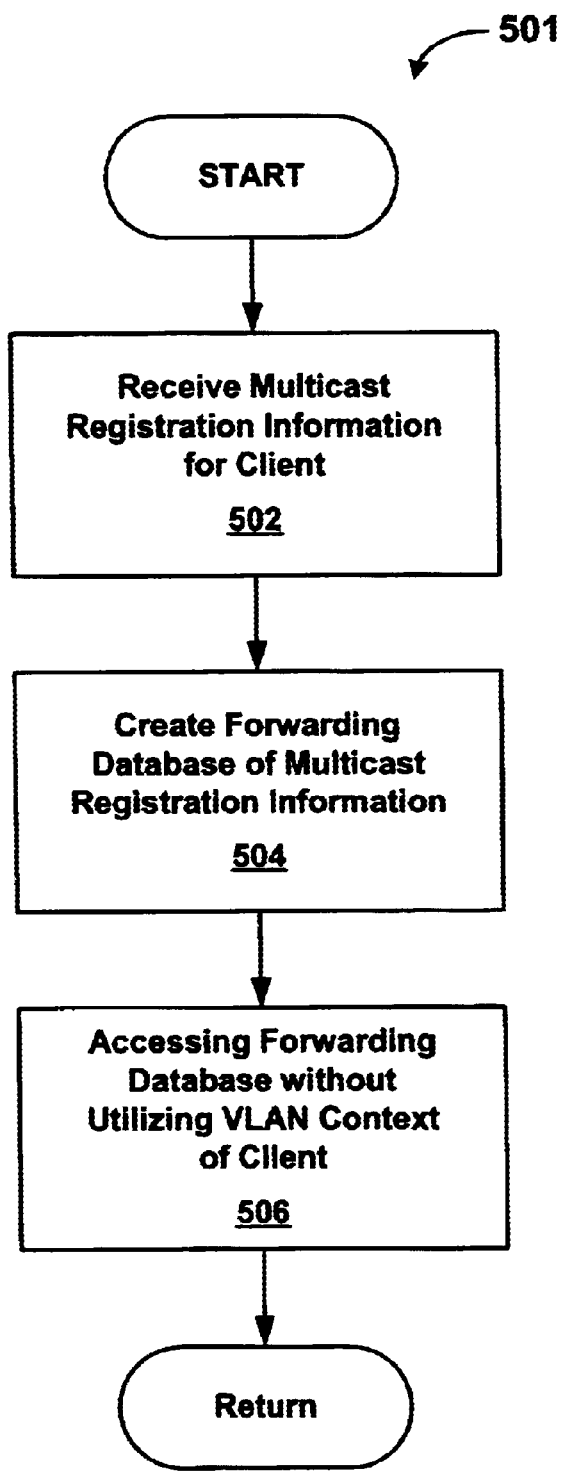
FIG. 5 is a flow chart of steps performed in accordance with one embodiment of the present claimed invention.

With reference still to FIG. 4, clients 406a, 408a, 410a, and 412a, coupled to port 414a of intermediate device 404a, reside within a common VLAN 428a. Clients 416a and 418a coupled to port 420a of intermediate device 404a reside within a common VLAN 430a. Hence VLAN 428a and VLAN 430a are accessed through common ports 424a and 422 of intermediate devices 404a and 402, respectively. Such a configuration is repeated for each of intermediate devices 404b–404d. In the following discussion, it will be assumed that each of intermediate devices 404a–404d has independently aggregated the VLAN context for its respective clients. Thus, the following discussion will set forth in detail an embodiment of the present invention in which intermediate device 402 efficiently handles multicast packets by ignoring VLAN (virtual local area network) context. In so doing, the present invention prevents unnecessary replication of multicast packets and avoids superfluous expensive lookups in multicast registration tables. Referring now to FIG. 5, a flow chart 501 of steps performed according to one embodiment of the present invention. In this embodiment intermediate device 402 receives multicast registration information for the client. In the present embodiment, the multicast registration information received by intermediate device 402 includes the aggregated VID as was described in detail above. Additionally, either this common aggregated VID is negotiated on the LAN 500 and registrations are made in this VLAN only, or it is negotiated (assumed) that intermediate device 402 will ignore the VLAN context for registrations/lookups and forward multicast packets tagged with the aggregated VLAN.

Next, at step 504, the present embodiment creates a forwarding database of the received multicast registration information. In one embodiment, the present invention creates a forwarding database of the multicast registration information wherein the forwarding database does not contain VLAN context. Instead, only port membership and IP (Internet protocol) address information is stored in memory (e.g. memory 427 of FIG. 4). The port membership information recites all of the ports on which a registration was received for a multicast group. As will be described below in detail, although the present embodiment "ignores" the VLAN context during lookup (and, in some embodiments, during creation of the forwarding database), the present embodiment may still consider the VLAN context during forwarding of a received multicast packet from ports 414a–414d and 420a–420d to coupled clients. Furthermore, in some embodiments, intermediate devices 404a–404d will contain memory (e.g. memory 429a–429d, respectively) for storing VLAN tagging information.

Referring still to step 504, a forwarding database which does not contain VLAN context is shown in table 600 of FIG. 6. As shown in FIG. 6, table 600 contains an IP address column 602, and a port membership column 604. Thus, the present embodiment eliminates the need to store VLAN context. As a result, the forwarding database of the present embodiment contains less data than a conventionally structured forwarding database, occupies less memory than a conventional forwarding database, and can be utilized with a less complex lookup engine.

Referring still to step 504, in another embodiment, the present invention creates a forwarding database of the multicast registration information wherein the forwarding database does contain VLAN context. In such an embodiment, port membership, IP address information, and VLAN context is stored in memory (e.g. memory 427 of FIG. 4). A forwarding database which does contain VLAN context is shown in table 700 of FIG. 7. As shown in FIG. 7, table 700 contains an IP address column 702, and VLAN context column 704, and a port membership column 706. As will be described in detail below, in such an embodiment the present invention will ignore the VLAN context when accessing the forwarding database. Although specific formats are shown in tables 600 and 700, the present invention is also well suited to embodiments having various other table formats, and to embodiments in which the data of tables 600 and 700 is not stored contiguously, in which the data is stored at various separate locations, and the like.

With reference now to step 506, the present embodiment then accesses the multicast registration information stored in the forwarding database without utilizing VLAN context. In an embodiment utilizing a forwarding database which includes VLAN context (e.g. table 700), the present embodiment ignores the VLAN context during lookup. As a result, lookups in the forwarding database are simplified and expedited.

Hence during operation, when an IP multicast packet is received at intermediate device 402 from, for example, Internet 426, intermediate device 402 performs a lookup. More particularly, intermediate device 402 performs a lookup ignoring the VLAN context. Thus, unlike conventional approaches in which an intermediate device performs a first lookup for a first VLAN, a second lookup for a second VLAN, and a third lookup for a third VLAN, and so on, intermediate device 402 of the present embodiment performs only a single lookup regardless of the number of VLANs. If intermediate device 402 accesses a forwarding database configured as shown in table 600, no VLAN context information is present. If, however, intermediate device 402 accesses a forwarding database configured as shown in table 700, the lookup engine of intermediate device 402 will ignore the VLAN context information.

After receiving the IP multicast packet and performing the single lookup, intermediate device 402 forwards the multicast packet (without requiring replication thereof) through port 422 and ports 424a–424d of intermediate devices 404a–404d, respectively, such that ports 214a–214d and 220a–220d will receive the multicast packet (tagged/untagged with the aggregated VID). That is, intermediate device 402 forwards the multicast packet to all the member ports without regard for their VLAN membership. In so doing, the present invention prevents unnecessary replication of multicast packets and avoids superfluous expensive lookups in multicast registration tables.

Continuing with the present example, once the multicast packet is received at ports 414a–414d and 420a–420d, ports 414a–414d and 420a–420d apply the VLAN context and transmit the multicast packet to the necessary clients (e.g. clients 406a–406d, 408a–408d, 410a–410d, 412a–412d, 416a–416d, and 418a–418d, respectively). Furthermore, in one embodiment ports 414a 414d and 420a–420d forward the multicast packet either tagged or untagged as indicated by the "untag" specification for the PVID (port VLAN identification) in the egress list. Thus, in one embodiment, the multicast packet carries an indication so that ports 414a–414d and 420a–420d understand that they need to apply the VLAN context. In one embodiment the indication is an internal VID (VLAN identification) or absence of a tag that the packet is tagged with when traversing the internal bus. However, the present invention is also well suited to employing various other implementation dependent parameters carried in the packet or set on a port in order to determine whether VLAN tagging by ports 414a–414d and 420a–420d is required. Such implementation dependent parameters are stored, for example, in memory 429a–429d of intermediate devices 404a–404d, respectively.

Additionally, when a multi-VLAN port is present the present embodiment examines the egress list for the multi-VLAN port. Even if the egress list for the multi-VLAN port contains only a single VID, if multicast registration was received in a single VLAN, the present embodiment operates in the same manner as if the multi-VLAN port was a single-VLAN port.

Thus, the present invention provides a method and system which eliminates unnecessary replication of multicast packets. The present invention further provides a method and system which reduces superfluous expensive lookups in multicast registration tables. The present invention also provides a system and method which achieves the above-listed accomplishments and which operates effectively in a VLAN environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A system for efficiently handling a multicast packet in a VLAN (virtual local area network) environment, said system comprising:
    a first client;
    a second client; and
    a first intermediate device adapted to be coupled to said first client and said second client, said first intermediate device adapted to receive multicast registration information for said first client and multicast registration information for said second client, said first intermediate device further adapted to create an aggregated list of said multicast registration information for said first client and said second client, said first intermediate device adapted to forward said aggregated list of said multicast registration information for said first client and said second client to a second intermediate device such that when handling said multicast packet at said second intermediate device, said second intermediate device accesses said aggregated list of said multicast registration information for said first client and said second client.

2. The system of claim 1 for efficiently handling a multicast packet in a VLAN environment wherein said first intermediate device is further adapted to create a database correlating said aggregated list of said multicast registration information for said first client and said second client to said multicast registration information for said first client and said multicast registration information for said second client.

3. The system of claim 1 for efficiently handling a multicast packet in a VLAN environment wherein said first intermediate device is adapted to create said aggregated list wherein said aggregated list is comprised of an aggregation of an egress list for a port of said first intermediate device to which said first client is coupled and an egress list for a port of said second intermediate device to which said second client is coupled.

4. The system of claim 1 for efficiently handling a multicast packet in a VLAN environment wherein when handling said multicast packet at said second intermediate device, said second intermediate device is adapted to access said aggregated list of said multicast registration information for said first client and said second client such that said second intermediate device forwards said multicast packet to said first intermediate device without unnecessary replication.

5. The system of claim 1 for efficiently handling a multicast packet in a VLAN environment wherein when handling said multicast packet which is to be transmitted between said first client and said second client, said first intermediate device is adapted to transmit said multicast packet between said first client and said second client without intervention by said second intermediate device.

6. The system of claim 1 for efficiently handling a multicast packet in a VLAN environment wherein said first intermediate device does not create said aggregated list when said multicast packet is not to be shared between said first client and said second client.

7. A method for efficiently handling a multicast packet in a VLAN (virtual local area network) environment, said method comprising the steps of:
   a) receiving, at a first intermediate device, multicast registration information for a first client;
   b) receiving, at said first intermediate device, multicast registration information for a second client;
   c) creating an aggregated list of said multicast registration information for said first client and said second client; and
   d) forwarding said aggregated list of said multicast registration information for said first client and said second client to a second intermediate device; and
   e) when handling said multicast packet at said second intermediate device, accessing said aggregated list of said multicast registration information for said first client and said second client.

8. The method for efficiently handling a multicast packet in a VLAN environment as recited in claim 7 wherein step c) comprises:
   creating a database correlating said aggregated list of said multicast registration information for said first client and said second client to said multicast registration information for said first client and said multicast registration information for said second client.

9. The method for efficiently handling a multicast packet in a VLAN environment as recited in claim 7 wherein said aggregated list of said multicast registration information for said first client and said second client is comprised of an aggregation of an egress list for a port of said first intermediate device to which said first client is coupled and an egress list for a port of said second intermediate device to which said second client is coupled.

10. The method for efficiently handling a multicast packet in a VLAN environment as recited in claim 7 wherein step e) comprises:
   when handling said multicast packet at said second intermediate device, accessing said aggregated list of said multicast registration information for said first client and said second client such that said second intermediate device forwards said multicast packet to said first intermediate device without unnecessary replication.

11. The method for efficiently handling a multicast packet in a VLAN environment as recited in claim 7 further comprising the step of:
   f) when handling said multicast packet which is to be transmitted between said first client and said second client, transmitting said multicast packet between said first client and said second client without intervention by said second intermediate device.

12. The method for efficiently handling a multicast packet in a VLAN environment as recited in claim 7 comprising:
   performing steps a) through e) unless said multicast packet is not to be shared between said first client and said second client.

13. The method for efficiently handling a multicast packet in a VLAN environment as recited in claim 7 further comprising the steps of:

f) upon receiving said aggregated list of said multicast registration information for said first client and said second client at said second intermediate device, creating a forwarding database using said aggregated list of said multicast registration information for said first client and said second client; and
   g) when handling said multicast packet at said second intermediate device, accessing said aggregated list of said multicast registration information for said first client and said second client stored in said forwarding database without utilizing VLAN context.

14. In a computer system having a processor coupled to a bus, a computer readable medium coupled to said bus and having stored therein a computer program that when executed by said processor causes said computer system to implement a method for efficiently handling a multicast packet in a VLAN environment, said method comprising the steps of:
   a) receiving, at a first intermediate device, multicast registration information for a first client;
   b) receiving, at said first intermediate device, multicast registration information for a second client;
   c) creating an aggregated list of said multicast registration information for said first client and said second client; and
   d) forwarding said aggregated list of said multicast registration information for said first client and said second client to a second intermediate device; and
   e) when handling said multicast packet at said second intermediate device, accessing said aggregated list of said multicast registration information for said first client and said second client.

15. The computer readable memory unit as described in claim 14 wherein step c) of said computer implemented method stored on said computer readable medium comprises:
   creating a database correlating said aggregated list of said multicast registration information for said first client and said second client to said multicast registration information for said first client and said multicast registration information for said second client.

16. The computer readable memory unit as described in claim 14 wherein said computer implemented method stored on said computer readable medium for efficiently handling a multicast packet in a VLAN environment further recites said aggregated list of said multicast registration information for said first client and said second client is comprised of an aggregation of an egress list for a port of said first intermediate device to which said first client is coupled and an egress list for a port of said second intermediate device to which said second client is coupled.

17. The computer readable memory unit as described in claim 14 wherein step e) of said computer implemented method stored on said computer readable medium comprises:
   when handling said multicast packet at said second intermediate device, accessing said aggregated list of said multicast registration information for said first client and said second client such that said second intermediate device forwards said multicast packet to said first intermediate device without unnecessary replication.

18. The computer readable memory unit as described in claim 14 wherein said computer implemented method stored on said computer readable medium further comprises the step of:
   f) when handling said multicast packet which is to be transmitted between said first client and said second client, transmitting said multicast packet between said first client and said second client without intervention by said second intermediate device.

19. The computer readable memory unit as described in claim 14 wherein said computer implemented method stored on said computer readable medium comprises:

performing steps a) through e) unless said multicast packet is not to be shared between said first client and said second client.

20. The computer readable memory unit as described in claim 14 wherein said computer implemented method stored on said computer readable medium further comprises the steps of:

f) upon receiving said aggregated list of said multicast registration information for said first client and said second client at said second intermediate device, creating a forwarding database using said aggregated list of said multicast registration information for said first client and said second client; and g) when handling said multicast packet at said second intermediate device, accessing said aggregated list of said multicast registration information for said first client and said second client stored in said forwarding database without utilizing VLAN context.

\* \* \* \* \*